(12) United States Patent
Cheng (10) Patent No.: US 12,164,138 B2
(45) Date of Patent: Dec. 10, 2024

(54) BACKLIGHT MODULE INCLUDING SWITCHABLE DIFFUSION SHEET AND DISPLAY DEVICE INCLUDING THE SAME

(71) Applicant: Wuhan China Star Optoelectronics Technology Co., Ltd., Hubei (CN)

(72) Inventor: Wei Cheng, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/772,516

(22) PCT Filed: Apr. 18, 2022

(86) PCT No.: PCT/CN2022/087416
§ 371 (c)(1),
(2) Date: Apr. 28, 2022

(87) PCT Pub. No.: WO2023/184614
PCT Pub. Date: Oct. 5, 2023

(65) Prior Publication Data
US 2024/0192432 A1    Jun. 13, 2024

(30) Foreign Application Priority Data
Apr. 2, 2022    (CN) .......................... 202210350312.X (51) Int. Cl.
*F21V 8/00* (2006.01)
*G02F 1/1335* (2006.01)
*G02F 1/13357* (2006.01)

(52) U.S. Cl.
CPC ..... *G02B 6/0051* (2013.01); *G02F 1/133504* (2013.01); *G02F 1/133606* (2013.01)

(58) Field of Classification Search
CPC ............. G02B 6/0051; G02F 1/133504; G02F 1/133606
See application file for complete search history.

(56) References Cited

U.S. PATENT DOCUMENTS

| 6,018,378 A | 1/2000 | Hirai et al. |
| 2010/0265435 A1 | 10/2010 | Hwang et al. |

(Continued)

FOREIGN PATENT DOCUMENTS

| CN | 101354120 | 1/2009 |
| CN | 202159156 | 3/2012 |

(Continued)

OTHER PUBLICATIONS

International Search Report and the Written Opinion Dated Dec. 15, 2022 From the International Searching Authority Re. Application No. PCT/CN2022/087416 and Its Translation Into English. (21 Pages).

(Continued)

*Primary Examiner* — Keith G. Delahoussaye (57) ABSTRACT

A backlight module and a display device are provided by the embodiments of the present application. The backlight module includes a light guide plate and a switchable diffusion sheet. The switchable diffusion sheet further includes a first conductive layer and a second conductive layer disposed opposite to each other. A polymer liquid crystal layer is disposed between the first conductive layer and the second conductive layer. In the backlight module of the embodiment of the present application, a thick glass in the prior art is replaced with the first conductive layer and the second conductive layer which are lighter and thinner than the thick glass, which can greatly reduce an overall thickness of the backlight module.

16 Claims, 2 Drawing Sheets

(56) References Cited

U.S. PATENT DOCUMENTS

2016/0154259 A1* 6/2016 Kim .................. H10K 50/85
                                                    349/33
2016/0356943 A1* 12/2016 Choi .................. G02F 1/1323

FOREIGN PATENT DOCUMENTS

| CN | 103605237 | 2/2014 |
| CN | 204790254 | 11/2015 |
| CN | 105549236 | 5/2016 |
| CN | 205229990 | 5/2016 |
| CN | 106773180 | 5/2017 |
| CN | 108254947 | 7/2018 |
| CN | 110936693 | 3/2020 |
| CN | 215067619 | 12/2021 |

OTHER PUBLICATIONS

Notification of Office Action and Search Report Dated Apr. 15, 2023 From the state Intellectual Property Office of the People's Republic of China Re. Application No. 202210350312.X and Its Translation Into English. (21 Pages).

Notification of Office Action and Search Report Dated Oct. 18, 2022 From the state Intellectual Property Office of the People's Republic of China Re. Application No. 202210350312.X and Its Translation Into English. (22 Pages).

* cited by examiner

BACKLIGHT MODULE INCLUDING SWITCHABLE DIFFUSION SHEET AND DISPLAY DEVICE INCLUDING THE SAME

RELATED APPLICATIONS

This application is a National Phase of PCT Patent Application No. PCT/CN2022/087416 having International filing date of Apr. 18, 2022, which claims the benefit of priority of Chinese Patent Application No. 202210350312.X filed on Apr. 2, 2022. The contents of the above applications are all incorporated by reference as if fully set forth herein in their entirety.

FIELD AND BACKGROUND OF THE INVENTION

The present application relates to the field of display technology, and in particular, to a backlight module and a display device.

With an advancement of technology and an iteration of consumer electronic products, users are paying more and more attention to an issue of privacy protection. In some occasions, people do not want other people to view a displayed picture on a display device, which requires the display device to have a privacy protection function to prevent other people within a viewing angle of the liquid crystal display from viewing the picture content. Privacy display devices provide protected viewing angles for content readability to target audiences and reduces content visibility in off-axis positions to prevent prying eyes.

A commonly used privacy display device is to cover a layer of privacy film on the display screen, but this privacy film is two-way privacy protection film. Therefore, it is necessary to attach a double-layer orthogonal privacy film to achieve full-view privacy protection, which greatly reduces a display brightness and increases an overall thickness.

SUMMARY OF THE INVENTION

The present application provides a backlight module and a display device, to solve a problem that an overall thickness of the backlight module in the prior art is relatively large.

In a first aspect, one embodiment of the present application provides a backlight module, including:
  a light guide plate;
  a switchable diffusion sheet disposed above the light guide plate, the switchable diffusion sheet comprises a first conductive layer and a second conductive layer arranged oppositely, wherein a polymer liquid crystal layer is disposed between the first conductive layer and the second conductive layer;
  when the switchable diffusion sheet is energized, the polymer liquid crystal layer is in a light-transmitting state, and when the switchable diffusion sheet is non-energized, the polymer liquid crystal layer is in a light-diffusing state.

In one possible embodiment, the polymer liquid crystal layer includes polymer glue and liquid crystal, and the polymer liquid crystal layer is respectively bonded with the first conductive layer and the second conductive layer through the polymer glue.

In one possible embodiment, a refractive index difference between a first refractive index corresponding to the liquid crystal and a second refractive index corresponding to the polymerizable glue is less than 0.2.

In one possible embodiment, the first refractive index is greater than the second refractive index corresponding to the polymerizable glue.

In one possible embodiment, the thicknesses of the first conductive layer and the second conductive layer are both ranges from 30 um to 70 um.

In one possible embodiment, a haze of the switchable diffusion sheet ranges from 30% to 50% when the switchable diffusion sheet is non-energized, and the haze of switchable diffusion sheet is less than 3% when the switchable diffusion sheet is energized.

In one possible embodiment, the first conductive layer includes a first base layer and a first sub-conductive layer, and wherein the second conductive layer includes a second base layer and a second sub-conductive layer, and wherein the first sub-conductive layer and the second sub-conductive layer are positioned on an outermost side of the switchable diffusion sheet.

In one possible embodiment, a film thickness of the first conductive layer and a film thickness of the second conductive layer are the same.

In one possible embodiment, the backlight module further includes a light-shielding structure, and wherein the light-shielding structure is disposed between the light guide plate and the switchable diffusion sheet;
  or the light-shielding structure is disposed inside the switchable diffusion sheet.

In a second aspect, one embodiment of the present application further provides a display device, the display device includes a display panel and the backlight module according to any one of the above, where the backlight module is configured to provide light to the display panel.

In the backlight module and the display device provided by the embodiments of the present application, the backlight module includes a light guide plate and a switchable diffusion sheet, and the switchable diffusion sheet further includes a first conductive layer and a second conductive layer disposed opposite to each other. A polymer liquid crystal layer is disposed between the first conductive layer and the second conductive layer. In the backlight module of the embodiment of the present application, the thicker glass in the prior art is replaced with the first conductive layer and the second conductive layer, which can greatly reduce an overall thickness of the backlight module.

BRIEF DESCRIPTION OF THE SEVERAL VIEWS OF THE DRAWINGS

In order to illustrate the technical solutions in the embodiments of the present application more clearly, the following briefly introduces the accompanying figures used in the description of the embodiments. Obviously, the accompanying figures in the following description are only some embodiments of the present application. For those skilled in the art, other figures can also be obtained from these figures without inventive steps.

DESCRIPTION OF SPECIFIC EMBODIMENTS OF THE INVENTION

The technical solutions in the embodiments of the present application will be clearly and completely described below with reference to the accompanying figures in the embodiments of the present application. Obviously, the described embodiments are only a part of the embodiments of the present application, but not all of the embodiments. Based on the embodiments of the present application, all other embodiments obtained by those skilled in the art without inventive steps shall fall within a protection scope of the present application.

In the description of the present application, it should be understood that the terms "center", "longitudinal", "lateral", "length", "width", "thickness", "upper", "lower", "front", "rear", "left", "right", "vertical", "horizontal", "top", "bottom", "inside", "outside", etc. indicate an orientation or positional relationship based on the orientation or position shown in the figures. The relation is only for a convenience of describing the present application and simplifying the description, rather than indicating or implying that the device or element referred to must have a unique orientation, be constructed and operated with a specific orientation, and therefore cannot be interpreted as a limitation to the present application. In addition, the terms "first" and "second" are only used for descriptive purposes, and should not be understood as indicating or implying relative importance or indicating the number of indicated technical features. Thus, a feature defined as "first", "second" may explicitly or implicitly include one or more features. In the description of the present application, "plurality" means two or more, unless otherwise expressly and specifically defined.

In the present application, the word "exemplary" is used to mean "serving as an example, illustration, or description.". Any embodiment described in the present application as "exemplary" is not necessarily to be construed as preferred or advantageous over other embodiments. The following description is presented to enable any person skilled in the art to make and use the present application. In the following description, details are set forth for a purpose of explanation. It is to be understood that one of ordinary skill in the art can realize that the present application may be practiced without the use of these specific details. In other instances, well-known structures and procedures have not been described in detail so as not to obscure a description of the present application with unnecessary detail. Thus, the present application is not intended to be limited to the embodiments shown but is to be accorded a widest scope consistent with principles disclosed herein.

Embodiments of the present application provide a backlight module and a display device, which will be described in detail below.

Figure 1:
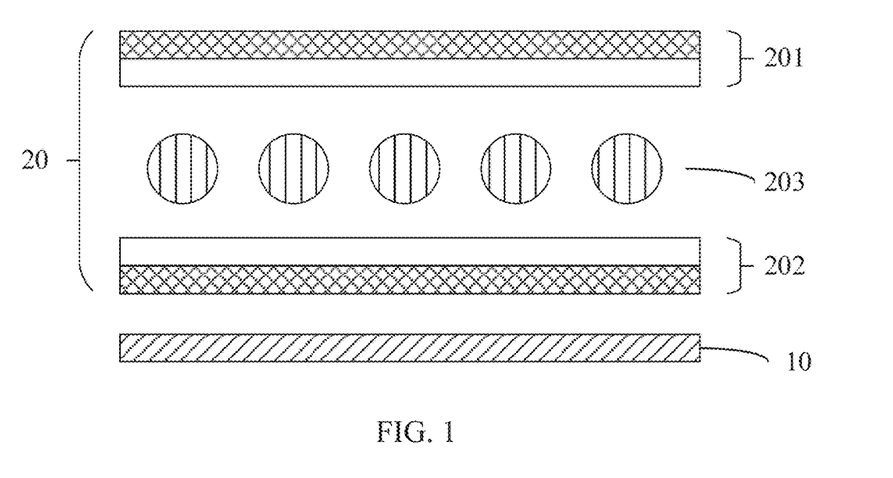
FIG. 1 is a schematic structural diagram of one embodiment of a backlight module provided by the present application.

As shown in FIG. 1, a schematic structural diagram of one embodiment of a backlight module provided by the present application is shown. In the embodiment shown in FIG. 1, the backlight module may include:

a light guide plate 10;

a switchable diffusion sheet 20 disposed above the light guide plate 10, and the switchable diffusion sheet 20 includes a first conductive layer 201 and a second conductive layer 202 arranged oppositely, wherein a polymer liquid crystal layer is disposed between the first conductive layer 201 and the second conductive layer 202.

In addition, the polymer liquid crystal layer is in a light-transmitting state when the switchable diffusion sheet 20 is energized, that is, light can pass through the switchable diffusion sheet 20 at this time. And further, the polymer liquid crystal layer is in a light-diffusing state when the switchable diffusion sheet is non-energized, that is, most of the light cannot pass through the switchable diffusion sheet 20 at this time.

In the backlight module provided by the embodiment of the present application, the backlight module includes a light guide plate and a switchable diffusion sheet, and the switchable diffusion sheet further includes a first conductive layer and a second conductive layer disposed opposite to each other, wherein a polymer liquid crystal layer is disposed between the first conductive layer and the second conductive layer. In the backlight module of the embodiment of the present application, a thick glass in the prior art is replaced with the first conductive layer and the second conductive layer which are thinner and lighter than the thick glass, which can greatly reduce an overall thickness of the backlight module.

In the embodiment shown in FIG. 1, the switchable diffusion sheet 20 includes a first conductive layer 201, a polymer liquid crystal layer 203 and a second conductive layer 202 which are arranged in sequence from bottom to top. The polymer liquid crystal layer 203 is formed by a polymer network formed by a polymer and a plurality of independent micron-sized liquid crystal droplets. Since a plurality of accommodating spaces are formed in the polymer network, a plurality of micron-sized liquid crystal droplets that are independent of each other can be dispersed in the polymer network to form the polymer liquid crystal layer 203. Since an optical axis of the liquid crystal droplets composed of liquid crystal molecules is in a free orientation, refractive indices of the liquid crystal droplets do not match a refractive index of a matrix of the polymer liquid crystal layer 203. The orientation of the optical axis of the liquid crystal droplets can be adjusted by applying an electric field, and a transparent state is presented when the refractive indices of the liquid crystal droplets are matched with the refractive index of a matrix of the polymer liquid crystal layer 203, and the liquid crystal droplets return to the original astigmatism state when the electric field is removed, thereby displaying.

Meanwhile, in the embodiment shown in FIG. 1, the first conductive layer 201 and the second conductive layer 202 are respectively disposed on an upper side and a lower side of the polymer liquid crystal layer 203. The first conductive layer 201 is bonded to the polymer liquid crystal layer 203 through a polymerizable glue, and the second conductive layer 202 is also bonded to the polymer liquid crystal layer 203 by the polymerizable glue.

The liquid crystal is dispersed in the polymerizable glue, and the polymerizable glue is not a single-layer structure; similarly, the liquid crystal is not an independent one-layer structure.

In some embodiments, the first conductive layer 201 and the second conductive layer 202 are made of a same material, and both may include metal oxides. Specifically, the first conductive layer 201 and the second conductive layer 202 may include metal film layer has conductive function, which are obtained by sputtering metal oxide materials on poly-ethylene terephthalate (PET) base material by using magnetron sputtering technology, and treating high temperature annealing treatment. The metal film layer is usually located on an outermost side of the first conductive layer 201 and the second conductive layer 202 to facilitate apply voltage.

That is, in the embodiments of the present application, both the first conductive layer 201 and the second conductive layer 202 are multi-layer structures, and both include a base layer and a conductive metal film layer manufactured on the base layer. For an overall structure of the switchable diffusion sheet 20, the switchable diffusion sheet 20 may include a first sub-conductive layer, a first base layer, a polymer liquid crystal layer, a second base layer, and a second sub-conductive layer. The first sub-conductive layer is manufactured by using the first metal oxide, and the second sub-conductive layer is manufactured by using the second metal oxide. Meanwhile, the first sub-conductive layer and the second sub-conductive layer are located on the outermost side of the switchable diffusion sheet.

Among them, the conductivities and light transmission performances of the conductive layers are different when the thicknesses of the film layers manufactured by the metal oxide material are different. Generally speaking, under a same process conditions and PET base material with a same performance, the thicker the thickness of the metal oxide film layer, the smaller the surface resistance of the conductive layer and the correspondingly smaller light transmittance. Therefore, in the embodiments of the present application, the light transmittances of the first conductive layer 201 and the second conductive layer 202 can be adjusted by adjusting the thicknesses of the metal oxide film layers.

In other embodiments, the base film layer of the first conductive layer 201 and the base film layer of the second conductive layer 202 can also be an ultra-thin glass (UTG) substrate, or a triacetate cellulose film (TAC), or can be flexible substrates with flexible plastic colorless polyimide (CPI) process, etc. Considering an actual manufacturing cost and a simplicity of the manufacturing process, a base film layer made of PET material is usually used.

In some embodiments, the metal oxide for manufacturing the first conductive layer 201 and the second conductive layer 202 may include indium tin oxide (ITO), zinc oxide (ZnO), or other metal oxides. At the same time, in some embodiments, an overall thickness of the first conductive layer 201 and an overall thickness of the second conductive layer 202 are generally ranges from 30 μm to 70 μm. That is, the overall thickness of the metal film layer on the same side plus the base film layer ranges from 30 μm to 70 μm. The thickness of the conductive metal layer is generally ranges from 400 angstroms to 500 angstroms. Meanwhile, the light transmittances of the first conductive layer 201 and the second conductive layer 202 are both greater than 88%.

In the above embodiment, the materials for manufacturing the first conductive layer 201 and the second conductive layer 202 may be the same or different. Meanwhile, the film thicknesses of the first conductive layer 201 and the second conductive layer 202 may be the same or different. Generally speaking, in order to simplify the manufacturing process, the preparation materials of the first conductive layer 201 and the second conductive layer 202 are generally the same, and the overall film thicknesses of the two are also the same.

In the embodiment shown in FIG. 1, the switchable diffusion sheet 20 needs to be energized and driven to change a direction of the liquid crystal droplets in the polymer liquid crystal layer 203 by voltage, so that the switchable diffusion sheet 20 can realize the polarization function. A driving voltage of the switchable diffusion sheet 20 is less than 12 volts (V); meanwhile, the switchable diffusion sheet 20 is generally driven by an AC voltage.

Under a condition of applying AC voltage, a corresponding haze of the switchable diffusion sheet 20 when not energized is less than 50%, usually ranges from 30% to 50%. On the other hand, the haze of the switchable diffusion sheet 20 is less than 3% when energized, and is usually ranges from 1.5% to 2%.

Haze refers to a percentage of transmitted light intensity that deviates from the incident light at an angle of more than 2.5° to a total transmitted light intensity. Greater haze means a decrease in film gloss and transparency, especially imaging. Therefore, if manufacturer want to get a clearer picture, the haze needed to be reduced. The haze range of the switchable diffusion sheet 20 in the backlight module in the embodiment of the present application when not energized is much smaller than the haze range when energized. Therefore, in the embodiment of the present application, the direction of the liquid crystal droplets in the polymer liquid crystal layer 203 can be changed by applying a voltage to the switchable diffusion sheet 20, thereby changing the light passing through the switchable diffusion sheet 20, so as to realize the function of anti-peeping.

The direction of the light needs to consider not only whether a voltage is applied on both sides of the switchable diffusion sheet 20, but also the refractive indices of different film layers. In the embodiment of the present application, the polymer liquid crystal layer 203 includes polymerizable glue and liquid crystal molecules, and there is a difference between the refractive index of the polymerizable glue and the refractive index of the liquid crystal molecules in the embodiment of the present application.

Specifically, the first refractive index corresponding to the liquid crystal is generally greater than the second refractive index corresponding to the polymerizable glue, and the refractive index difference between the first refractive index and the second refractive index is less than 0.2. In a specific embodiment, the refractive index difference between the first refractive index and the second refractive index may be 0.12.

Meanwhile, in the embodiments of the present application, the first refractive index corresponding to the liquid crystal is usually ranges from 1.6 to 1.8; specifically, it may range from 1.65 to 1.77. The second refractive index corresponding to the polymerizable glue is usually ranges from 1.4 to 1.6.

Because the first conductive layer 201 and the second conductive layer 202 are multi-layer structures, that is, they may include the base layer made of PET material, wherein a refractive index of the base layer made of PET material in the embodiment of the present application ranges from 1.5 to 1.6. In a specific embodiment, the refractive index of the base layer made of PET material may be 1.54, wherein the refractive index of the base layer also changes when the material of the base layer changes.

It should be noted that, in the embodiment of the present application, the material selection of the liquid crystal droplets in the polymer liquid crystal layer 203 is not limited, and the material of the polymerizable glue is also not limited. It is only necessary to make the first refractive index corresponding to the liquid crystal is more than the second refractive index corresponding to the polymerizable glue, and the refractive index difference between the first refractive index and the second refractive index is less than 0.2.

In a specific embodiment, glass is usually used as the base layer in the diffuser in the prior art, and in the embodiment of the present application, the diffuser in the prior art is replaced with the switchable diffusion sheet 20 provided in the embodiment of the present application. The base layer in the switchable diffusion sheet 20 is replaced with a base layer made of PET material. In a specific embodiment, the thickness of the base layer made of PET material is 50 um. Compared with the thickness of the glass base layer of 0.2 mm in the prior art, the thickness of the base layer is greatly reduced, thereby reducing an overall thickness of the backlight module to achieve thinning.

Figure 2:
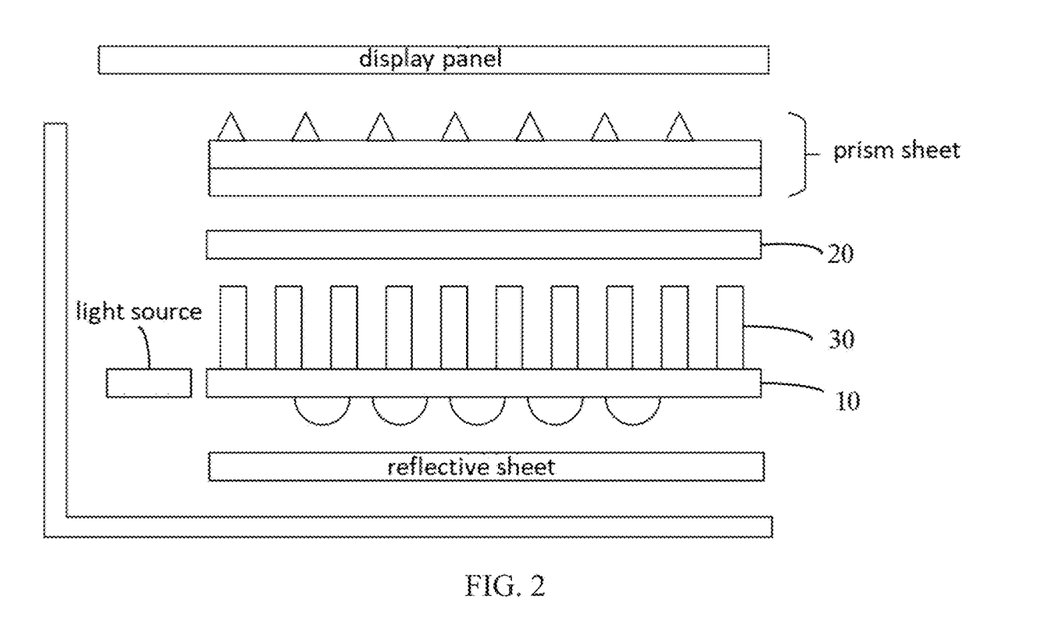
FIG. 2 is a schematic structural diagram of one embodiment of a display device provided by the present application.

As shown in FIG. 2, a schematic structural diagram of one embodiment of a display device provided by the present application is shown; the display device shown in FIG. 2 includes a display panel, and the backlight module as described in any preceding item. In the backlight module shown in FIG. 2, the backlight module may further include a light-shielding structure 30, and the light-shielding structure 30 may be disposed between the light guide plate 10 and the switchable diffusion sheet 20. In other embodiments, the light-shielding structure 30 may also be directly disposed in the switchable diffusion sheet 20.

In some embodiments, the light-shielding structure 30 can be manufactured on the light guide plate 10 by using black ink, color resist, or shielding metal. A height of the light-shielding structure 30 ranges from 0.5 um to 20 um. The light-shielding structure 30 can be manufactured by a single-layer-high-column-height method, or a multi-layer stacking method. That is, the light-shielding structure 30 can be a single-layer structure or a multi-layer stack structure.

In the embodiment shown in FIG. 2, the light-shielding structure 30 is disposed above the light guide plate 10 and connected to the light guide plate 10. At this time, the light-shielding structure 30 and the light guide plate 10 are generally manufactured simultaneously as a whole when manufacturing the light-shielding structure 30. In other embodiments, the light-shielding structure 30 may also be disposed between the light guide plate 10 and the switchable diffusion sheet 20, and the light-shielding structure 30 is connected to the switchable diffusion sheet 20.

In the embodiment shown in FIG. 2, the backlight module further includes a prism sheet, and the prism sheet is disposed above the switchable diffusion sheet 20 for improving the light extraction rate of light.

Meanwhile, in the display device shown in FIG. 2, the display device further includes a display panel. The display panel is disposed above the backlight module, and the backlight module provides light to the display panel, so that the display panel displays a picture. In the embodiments of the present application, the display panel is a liquid crystal display (LCD); that is, the backlight modules provided in the embodiments of the present application are mainly used in LCD displays.

Figure 3:
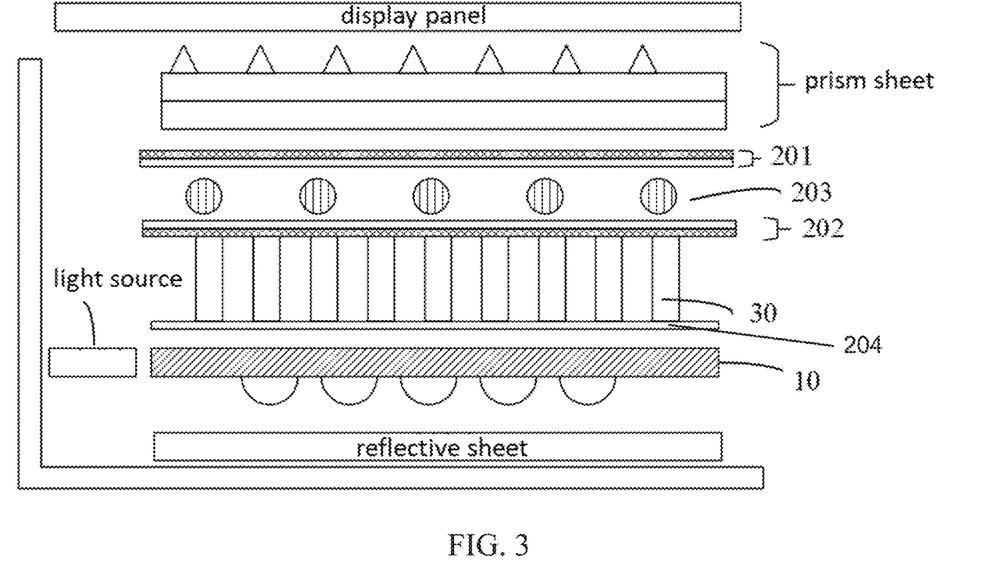
FIG. 3 is a schematic structural diagram of another embodiment of the display device provided by the present application.

As shown in FIG. 3, a schematic structural diagram of another embodiment of the display device provided by the embodiment of the present application is shown. In the embodiment shown in FIG. 3, the light-shielding structure 30 is disposed inside the switchable diffusion sheet 20. Specifically, the switchable diffusion sheet includes: the first conductive layer 201, the polymer liquid crystal layer, the second conductive layer 202, the light-shielding structure 30, and the PET substrate 204 which are arranged in sequence from top to bottom. The light-shielding structure is provided below the second conductive layer 202, and supports the light-shielding structure 30.

Figure 4:
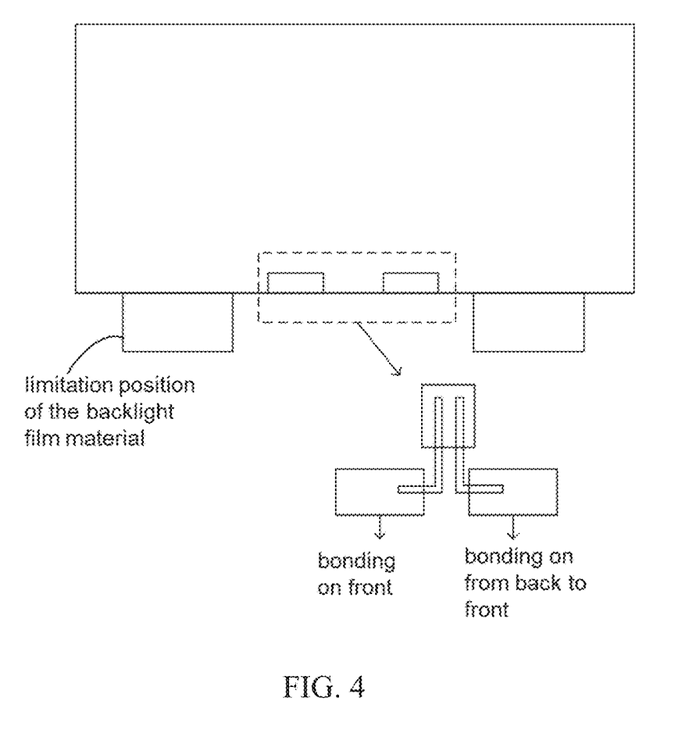
FIG. 4 is a schematic diagram of one embodiment of a switchable diffusion sheet provided by the present application.

As shown in FIG. 4, a schematic diagram of an embodiment of the switchable diffusion sheet provided by the embodiment of the present application is shown. In FIG. 4, a size of the switchable diffusion sheet 20 can be set according to actual needs. For example, the switchable diffusion sheet 20 can be a same size as the backlight film in the backlight module, or the size of the display screen.

However, if the size of the switchable diffusion sheet 20 is consistent with the size of the backlight film, there is still a positioning problem. As shown in FIG. 4, there is also a protruding limitation position of the backlight film material to fix the switchable diffusion sheet 20.

At the same time, since the switchable diffusion sheet 20 is composed of the upper and lower conductive films and a middle liquid crystal layer, it is necessary to apply electrical signals to the upper and lower conductive films to drive the liquid crystal. Therefore, the conductive films on the upper and lower sides of the switchable diffusion sheet 20 need to be attached to the backlight film material, and attached to the non-display area of the display panel. The conductive film in the switchable diffusion sheet 20 is partially attached to the non-display area of the display panel, and a voltage is applied to the part of the switchable diffusion sheet 20 attached to the backlight film, wherein the switchable diffusion sheet 20 is usually a rectangular area with length ranges from 3 um to 5 um and width ranges from 1 um to 2 um attached to the non-display area.

Embodiments of the present application further provide a display device, which includes the above display panel and the backlight module described in any one of the above. The backlight module is used to provide light to the display panel, so that the display panel can display a picture.

As shown in FIG. 1, a schematic structural diagram of one embodiment of a backlight module provided by the present application is shown. In the embodiment shown in FIG. 1, the backlight module may include:

a light guide plate 10;

a switchable diffusion sheet 20 disposed above the light guide plate 10, and the switchable diffusion sheet 20 includes a first conductive layer 201 and a second conductive layer 202 arranged oppositely, wherein a polymer liquid crystal layer is disposed between the first conductive layer 201 and the second conductive layer 202.

In addition, the polymer liquid crystal layer is in a light-transmitting state when the switchable diffusion sheet 20 is energized, that is, light can pass through the switchable diffusion sheet 20 at this time. And further, the polymer liquid crystal layer is in a light-diffusing state when the switchable diffusion sheet is non-energized, that is, most of the light cannot pass through the switchable diffusion sheet 20 at this time.

In the backlight module provided by the embodiment of the present application, the backlight module includes a light guide plate and a switchable diffusion sheet, and the switchable diffusion sheet further includes a first conductive layer and a second conductive layer disposed opposite to each other, wherein a polymer liquid crystal layer is disposed between the first conductive layer and the second conductive layer. In the backlight module of the embodiment of the present application, a thick glass in the prior art is replaced with the first conductive layer and the second conductive layer which are thinner and lighter than the thick glass, which can greatly reduce an overall thickness of the backlight module.

In the embodiment shown in FIG. 1, the switchable diffusion sheet 20 includes a first conductive layer 201, a polymer liquid crystal layer 203 and a second conductive layer 202 which are arranged in sequence from bottom to top.

The polymer liquid crystal layer 203 is formed by a polymer network formed by a polymer and a plurality of independent micron-sized liquid crystal droplets. Since a plurality of accommodating spaces are formed in the polymer network, a plurality of micron-sized liquid crystal droplets that are independent of each other can be dispersed in the polymer network to form the polymer liquid crystal layer 203. Since an optical axis of the liquid crystal droplets composed of liquid crystal molecules is in a free orientation, refractive indices of the liquid crystal droplets do not match a refractive index of a matrix of the polymer liquid crystal layer 203. The orientation of the optical axis of the liquid crystal droplets can be adjusted by applying an electric field, and a transparent state is presented when the refractive indices of the liquid crystal droplets are matched with the refractive index of a matrix of the polymer liquid crystal layer 203, and the liquid crystal droplets return to the original astigmatism state when the electric field is removed, thereby displaying.

Meanwhile, in the embodiment shown in FIG. 1, the first conductive layer 201 and the second conductive layer 202 are respectively disposed on an upper side and a lower side of the polymer liquid crystal layer 203. The first conductive layer 201 is bonded to the polymer liquid crystal layer 203 through a polymerizable glue, and the second conductive layer 202 is also bonded to the polymer liquid crystal layer 203 by the polymerizable glue. The liquid crystal is dispersed in the polymerizable glue, and the polymerizable glue is not a single-layer structure; similarly, the liquid crystal is not an independent one-layer structure.

In some embodiments, the first conductive layer 201 and the second conductive layer 202 are made of a same material, and both may include metal oxides. Specifically, the first conductive layer 201 and the second conductive layer 202 may include metal film layer has conductive function, which are obtained by sputtering metal oxide materials on poly-ethylene terephthalate (PET) base material by using magnetron sputtering technology, and treating high temperature annealing treatment. The metal film layer is usually located on an outermost side of the first conductive layer 201 and the second conductive layer 202 to facilitate apply voltage.

That is, in the embodiments of the present application, both the first conductive layer 201 and the second conductive layer 202 are multi-layer structures, and both include a base layer and a conductive metal film layer manufactured on the base layer. For an overall structure of the switchable diffusion sheet 20, the switchable diffusion sheet 20 may include a first sub-conductive layer, a first base layer, a polymer liquid crystal layer, a second base layer, and a second sub-conductive layer. The first sub-conductive layer is manufactured by using the first metal oxide, and the second sub-conductive layer is manufactured by using the second metal oxide. Meanwhile, the first sub-conductive layer and the second sub-conductive layer are located on the outermost side of the switchable diffusion sheet.

Among them, the conductivities and light transmission performances of the conductive layers are different when the thicknesses of the film layers manufactured by the metal oxide material are different. Generally speaking, under a same process conditions and PET base material with a same performance, the thicker the thickness of the metal oxide film layer, the smaller the surface resistance of the conductive layer and the correspondingly smaller light transmittance. Therefore, in the embodiments of the present application, the light transmittances of the first conductive layer 201 and the second conductive layer 202 can be adjusted by adjusting the thicknesses of the metal oxide film layers.

In other embodiments, the base film layer of the first conductive layer 201 and the base film layer of the second conductive layer 202 can also be an ultra-thin glass (UTG) substrate, or a triacetate cellulose film (TAC), or can be flexible substrates with flexible plastic colorless polyimide (CPI) process, etc. Considering an actual manufacturing cost and a simplicity of the manufacturing process, a base film layer made of PET material is usually used.

In some embodiments, the metal oxide for manufacturing the first conductive layer 201 and the second conductive layer 202 may include indium tin oxide (ITO), zinc oxide (ZnO), or other metal oxides. At the same time, in some embodiments, an overall thickness of the first conductive layer 201 and an overall thickness of the second conductive layer 202 are generally ranges from 30 µm to 70 µm. That is, the overall thickness of the metal film layer on the same side plus the base film layer ranges from 30 µm to 70 um. The thickness of the conductive metal layer is generally ranges from 400 angstroms to 500 angstroms. Meanwhile, the light transmittances of the first conductive layer 201 and the second conductive layer 202 are both greater than 88%.

In the above embodiment, the materials for manufacturing the first conductive layer 201 and the second conductive layer 202 may be the same or different. Meanwhile, the film thicknesses of the first conductive layer 201 and the second conductive layer 202 may be the same or different. Generally speaking, in order to simplify the manufacturing process, the preparation materials of the first conductive layer 201 and the second conductive layer 202 are generally the same, and the overall film thicknesses of the two are also the same.

In the embodiment shown in FIG. 1, the switchable diffusion sheet 20 needs to be energized and driven to change a direction of the liquid crystal droplets in the polymer liquid crystal layer 203 by voltage, so that the switchable diffusion sheet 20 can realize the polarization function. A driving voltage of the switchable diffusion sheet 20 is less than 12 volts (V); meanwhile, the switchable diffusion sheet 20 is generally driven by an AC voltage.

Under a condition of applying AC voltage, a corresponding haze of the switchable diffusion sheet 20 when not energized is less than 50%, usually ranges from 30% to 50%. On the other hand, the haze of the switchable diffusion sheet 20 is less than 3% when energized, and is usually ranges from 1.5% to 2%.

Haze refers to a percentage of transmitted light intensity that deviates from the incident light at an angle of more than 2.5° to a total transmitted light intensity. Greater haze means a decrease in film gloss and transparency, especially imaging. Therefore, if manufacturer want to get a clearer picture, the haze needed to be reduced. The haze range of the switchable diffusion sheet 20 in the backlight module in the embodiment of the present application when not energized is much smaller than the haze range when energized. Therefore, in the embodiment of the present application, the direction of the liquid crystal droplets in the polymer liquid crystal layer 203 can be changed by applying a voltage to the switchable diffusion sheet 20, thereby changing the light passing through the switchable diffusion sheet 20, so as to realize the function of anti-peeping.

The direction of the light needs to consider not only whether a voltage is applied on both sides of the switchable diffusion sheet 20, but also the refractive indices of different film layers. In the embodiment of the present application, the polymer liquid crystal layer 203 includes polymerizable glue and liquid crystal molecules, and there is a difference between the refractive index of the polymerizable glue and the refractive index of the liquid crystal molecules in the embodiment of the present application.

Specifically, the first refractive index corresponding to the liquid crystal is generally greater than the second refractive index corresponding to the polymerizable glue, and the refractive index difference between the first refractive index and the second refractive index is less than 0.2. In a specific embodiment, the refractive index difference between the first refractive index and the second refractive index may be 0.12.

Meanwhile, in the embodiments of the present application, the first refractive index corresponding to the liquid crystal is usually ranges from 1.6 to 1.8; specifically, it may range from 1.65 to 1.77. The second refractive index corresponding to the polymerizable glue is usually ranges from 1.4 to 1.6.

Because the first conductive layer 201 and the second conductive layer 202 are multi-layer structures, that is, they may include the base layer made of PET material, wherein a refractive index of the base layer made of PET material in the embodiment of the present application ranges from 1.5 to 1.6. In a specific embodiment, the refractive index of the base layer made of PET material may be 1.54, wherein the refractive index of the base layer also changes when the material of the base layer changes.

It should be noted that, in the embodiment of the present application, the material selection of the liquid crystal droplets in the polymer liquid crystal layer 203 is not limited, and the material of the polymerizable glue is also not limited. It is only necessary to make the first refractive index corresponding to the liquid crystal is more than the second refractive index corresponding to the polymerizable glue, and the refractive index difference between the first refractive index and the second refractive index is less than 0.2.

In a specific embodiment, glass is usually used as the base layer in the diffuser in the prior art, and in the embodiment of the present application, the diffuser in the prior art is replaced with the switchable diffusion sheet 20 provided in the embodiment of the present application. The base layer in the switchable diffusion sheet 20 is replaced with a base layer made of PET material. In a specific embodiment, the thickness of the base layer made of PET material is 50 um. Compared with the thickness of the glass base layer of 0.2 mm in the prior art, the thickness of the base layer is greatly reduced, thereby reducing an overall thickness of the backlight module to achieve thinning.

As shown in FIG. 2, a schematic structural diagram of one embodiment of a display device provided by the present application is shown; the display device shown in FIG. 2 includes a display panel, and the backlight module as described in any preceding item. In the backlight module shown in FIG. 2, the backlight module may further include a light-shielding structure 30, and the light-shielding structure 30 may be disposed between the light guide plate 10 and the switchable diffusion sheet 20. In other embodiments, the light-shielding structure 30 may also be directly disposed in the switchable diffusion sheet 20.

In some embodiments, the light-shielding structure 30 can be manufactured on the light guide plate 10 by using black ink, color resist, or shielding metal. A height of the light-shielding structure 30 ranges from 0.5 um to 20 um. The light-shielding structure 30 can be manufactured by a single-layer-high-column-height method, or a multi-layer stacking method. That is, the light-shielding structure 30 can be a single-layer structure or a multi-layer stack structure.

In the embodiment shown in FIG. 2, the light-shielding structure 30 is disposed above the light guide plate 10 and connected to the light guide plate 10. At this time, the light-shielding structure 30 and the light guide plate 10 are generally manufactured simultaneously as a whole when manufacturing the light-shielding structure 30. In other embodiments, the light-shielding structure 30 may also be disposed between the light guide plate 10 and the switchable diffusion sheet 20, and the light-shielding structure 30 is connected to the switchable diffusion sheet 20.

In the embodiment shown in FIG. 2, the backlight module further includes a prism sheet, and the prism sheet is disposed above the switchable diffusion sheet 20 for improving the light extraction rate of light.

Meanwhile, in the display device shown in FIG. 2, the display device further includes a display panel. The display panel is disposed above the backlight module, and the backlight module provides light to the display panel, so that the display panel displays a picture. In the embodiments of the present application, the display panel is a liquid crystal display (LCD); that is, the backlight modules provided in the embodiments of the present application are mainly used in LCD displays.

As shown in FIG. 3, a schematic structural diagram of another embodiment of the display device provided by the embodiment of the present application is shown. In the embodiment shown in FIG. 3, the light-shielding structure 30 is disposed inside the switchable diffusion sheet 20. Specifically, the switchable diffusion sheet includes: the first conductive layer 201, the polymer liquid crystal layer, the second conductive layer 202, the light-shielding structure 30, and the PET substrate which are arranged in sequence from top to bottom. The light-shielding structure is provided below the second conductive layer 202, and supports the light-shielding structure 30.

As shown in FIG. 4, a schematic diagram of an embodiment of the switchable diffusion sheet provided by the embodiment of the present application is shown. In FIG. 4, a size of the switchable diffusion sheet 20 can be set according to actual needs. For example, the switchable diffusion sheet 20 can be a same size as the backlight film in the backlight module, or the size of the display screen.

However, if the size of the switchable diffusion sheet 20 is consistent with the size of the backlight film, there is still a positioning problem.

As shown in FIG. 4, there is also a protruding limitation position of the backlight film material to fix the switchable diffusion sheet 20.

At the same time, since the switchable diffusion sheet 20 is composed of the upper and lower conductive films and a middle liquid crystal layer, it is necessary to apply electrical signals to the upper and lower conductive films to drive the liquid crystal. Therefore, the conductive films on the upper and lower sides of the switchable diffusion sheet 20 need to be attached to the backlight film material, and attached to the non-display area of the display panel. The conductive film in the switchable diffusion sheet 20 is partially attached to the non-display area of the display panel, and a voltage is applied to the part of the switchable diffusion sheet 20 attached to the backlight film, wherein the switchable diffusion sheet 20 is usually a rectangular area with length ranges from 3 um to 5 um and width ranges from 1 um to 2 um attached to the non-display area.

A backlight module and a display device provided by the embodiments of the present application have been introduced in detail above. The principles and implementations of the present application are described herein by using specific examples. The descriptions of the above embodiments are only used to help understand the method and a core idea of the present application. At the same time, for those skilled in the art, according to the idea of the present invention, there will be changes in the specific embodiments and application scope. To sum up, the contents of this specification should not be construed as limitation of the present application.

What is claimed is:

1. A backlight module, comprising:
    a light guide plate; and
    a switchable diffusion sheet disposed above the light guide plate, the switchable diffusion sheet comprises a first conductive layer and a second conductive layer arranged oppositely, wherein a polymer liquid crystal layer is disposed between the first conductive layer and the second conductive layer;
    wherein the first conductive layer comprises a first base layer and a first sub-conductive layer, and the second conductive layer comprises a second base layer and a second sub-conductive layer, and wherein the first sub-conductive layer and the second sub-conductive layer are positioned on an outermost side of the switchable diffusion sheet; the backlight module further comprises a light-shielding structure formed by shielding metal, the light-shielding structure is disposed inside the switchable diffusion sheet and beneath the second sub-conductive layer, and the switchable diffusion sheet further comprises a poly-ethylene terephthalate (PET) substrate configured to support the light-shielding structure;
    wherein when the switchable diffusion sheet is energized, the polymer liquid crystal layer is in a light-transmitting state, and when the switchable diffusion sheet is non-energized, the polymer liquid crystal layer is in a light-diffusing state.

2. The backlight module according to claim 1, wherein the polymer liquid crystal layer comprises polymer glue and liquid crystal, and the polymer liquid crystal layer is respectively bonded with the first conductive layer and the second conductive layer through the polymer glue.

3. The backlight module according to claim 2, wherein a refractive index difference between a first refractive index corresponding to the liquid crystal and a second refractive index corresponding to the polymerizable glue is less than 0.2.

4. The backlight module according to claim 3, wherein the first refractive index is greater than the second refractive index corresponding to the polymerizable glue.

5. The backlight module according to claim 2, wherein the thicknesses of the first conductive layer and the second conductive layer are both ranges from 30 um to 70 um.

6. The backlight module according to claim 1, wherein a haze of the switchable diffusion sheet ranges from 30% to 50% when the switchable diffusion sheet is non-energized, and the haze of switchable diffusion sheet is less than 3% when the switchable diffusion sheet is energized.

7. The backlight module according to claim 1, wherein the first sub-conductive layer comprises a first metal oxide, and the first metal oxide enables the first sub-conductive layer to have a conductive function, and wherein the second sub-conductive layer comprises a second metal oxide, and the second metal oxide enables the second sub-conductive layer to have a conductive function.

8. The backlight module according to claim 1, wherein a film thickness of the first conductive layer and a film thickness of the second conductive layer are the same.

9. A display device, comprising a display panel and a backlight module, wherein the backlight module is configured to provide light to the display panel, and the backlight module comprises:
    a light guide plate; and
    a switchable diffusion sheet disposed above the light guide plate, the switchable diffusion sheet comprises a first conductive layer and a second conductive layer arranged oppositely, wherein a polymer liquid crystal layer is disposed between the first conductive layer and the second conductive layer;
    wherein the first conductive layer comprises a first base layer and a first sub-conductive layer, and the second conductive layer comprises a second base layer and a second sub-conductive layer, and wherein the first sub-conductive layer and the second sub-conductive layer are positioned on an outermost side of the switchable diffusion sheet; the backlight module further comprises a light-shielding structure formed by shielding metal, the light-shielding structure is disposed inside the switchable diffusion sheet and beneath the second sub-conductive layer, and the switchable diffusion sheet further comprises a poly-ethylene terephthalate (PET) substrate configured to support the light-shielding structure;
    wherein when the switchable diffusion sheet is energized, the polymer liquid crystal layer is in a light-transmitting state, and when the switchable diffusion sheet is non-energized, the polymer liquid crystal layer is in a light-diffusing state.

10. The backlight module according to claim 9, wherein the polymer liquid crystal layer comprises polymer glue and liquid crystal, and the polymer liquid crystal layer is respectively bonded with the first conductive layer and the second conductive layer through the polymer glue.

11. The backlight module according to claim 10, wherein a refractive index difference between a first refractive index corresponding to the liquid crystal and a second refractive index corresponding to the polymerizable glue is less than 0.2.

12. The backlight module according to claim 11, wherein the first refractive index is greater than the second refractive index corresponding to the polymerizable glue.

13. The backlight module according to claim 10, wherein the thicknesses of the first conductive layer and the second conductive layer are both ranges from 30 um to 70 um.

14. The backlight module according to claim 9, wherein a haze of the switchable diffusion sheet ranges from 30% to 50% when the switchable diffusion sheet is non-energized, and the haze of switchable diffusion sheet is less than 3% when the switchable diffusion sheet is energized.

15. The backlight module according to claim 9, wherein the first sub-conductive layer comprises a first metal oxide, and the first metal oxide enables the first sub-conductive layer to have a conductive function, and wherein the second sub-conductive layer comprises a second metal oxide, and the second metal oxide enables the second sub-conductive layer to have a conductive function.

16. The backlight module according to claim 9, wherein a film thickness of the first conductive layer and a film thickness of the second conductive layer are the same.

* * * * *